United States Patent

Lenk

[11] 4,141,380
[45] Feb. 27, 1979

[54] FLOW-LIMITING DEVICE FOR A PIPE CARRYING A FLUID OR GASEOUS MEDIUM

[75] Inventor: Arthur Lenk, Essen-Borbeck, Fed. Rep. of Germany Germany

[73] Assignee: STEAG Aktiengesellschaft, Essen, Fed. Rep. of Germany

[21] Appl. No.: 745,970

[22] Filed: Nov. 29, 1976

[30] Foreign Application Priority Data

Nov. 29, 1975 [DE] Fed. Rep. of Germany ....... 2553775

[51] Int. Cl.² ............................................. F16K 15/03
[52] U.S. Cl. .................................. 137/513.5; 137/521
[58] Field of Search ............... 138/46; 137/513.5, 521, 137/527, 527.2, 527.4, 527.6, 527.8, 494, 498, 499, 504, 513.3, 513.7

[56] References Cited

U.S. PATENT DOCUMENTS

| | | | |
|---|---|---|---|
| 1,105,280 | 7/1914 | Kurtz ................................ | 137/521 |
| 2,217,380 | 10/1940 | Pedder et al. ...................... | 137/517 |
| 2,864,394 | 12/1958 | Hempel ............................ | 137/521 X |
| 3,128,785 | 4/1964 | Krummel ......................... | 137/527 X |
| 3,374,804 | 3/1968 | Stegerud ......................... | 137/521 X |
| 3,380,474 | 4/1968 | Mills ............................... | 137/521 X |
| 3,421,545 | 1/1969 | De Marco ........................ | 137/513.3 |

*Primary Examiner*—William R. Cline
*Attorney, Agent, or Firm*—Remy J. VanOphem

[57] ABSTRACT

A flow-limiting device for a pipe carrying a fluid or gaseous medium, comprising a flap, means mounting the flap in the pipe for pivotal movement in a manner to vary the cross-sectional area of flow through the pipe, and spring means urging the flap in a direction to increase the cross-sectional area of flow and against the direction of flow through the pipe, so that the flap varies the cross-sectional area of flow through the pipe in dependence on the kinetic energy differential of the medium upstream and downstream of the flap. The spring means comprise a leaf spring one end of which is mounted in an upper part of a housing for insertion in the pipe and the other end of which carries the flap. There is a clearance beneath the lower edge of the flap to permit the passage of deposits in the medium past the flap in all positions thereof.

4 Claims, 2 Drawing Figures

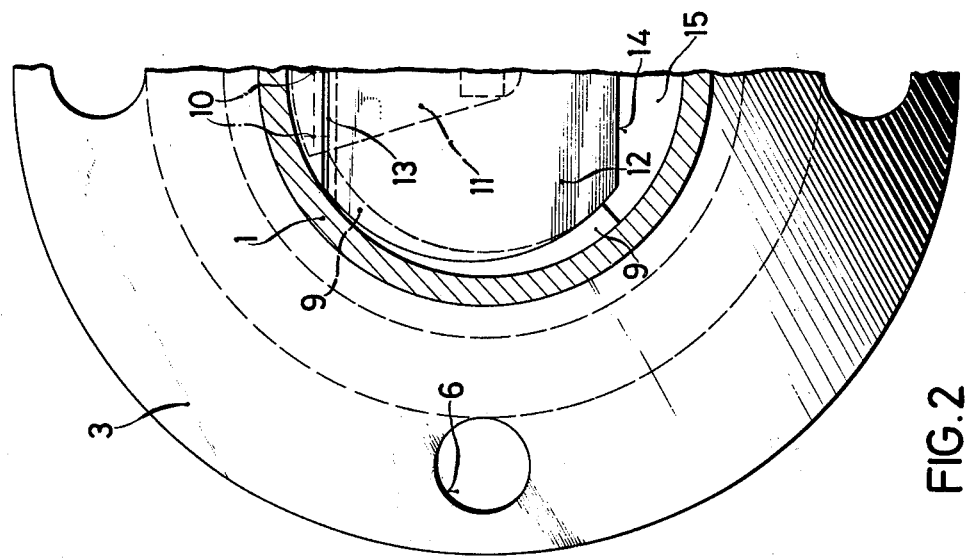
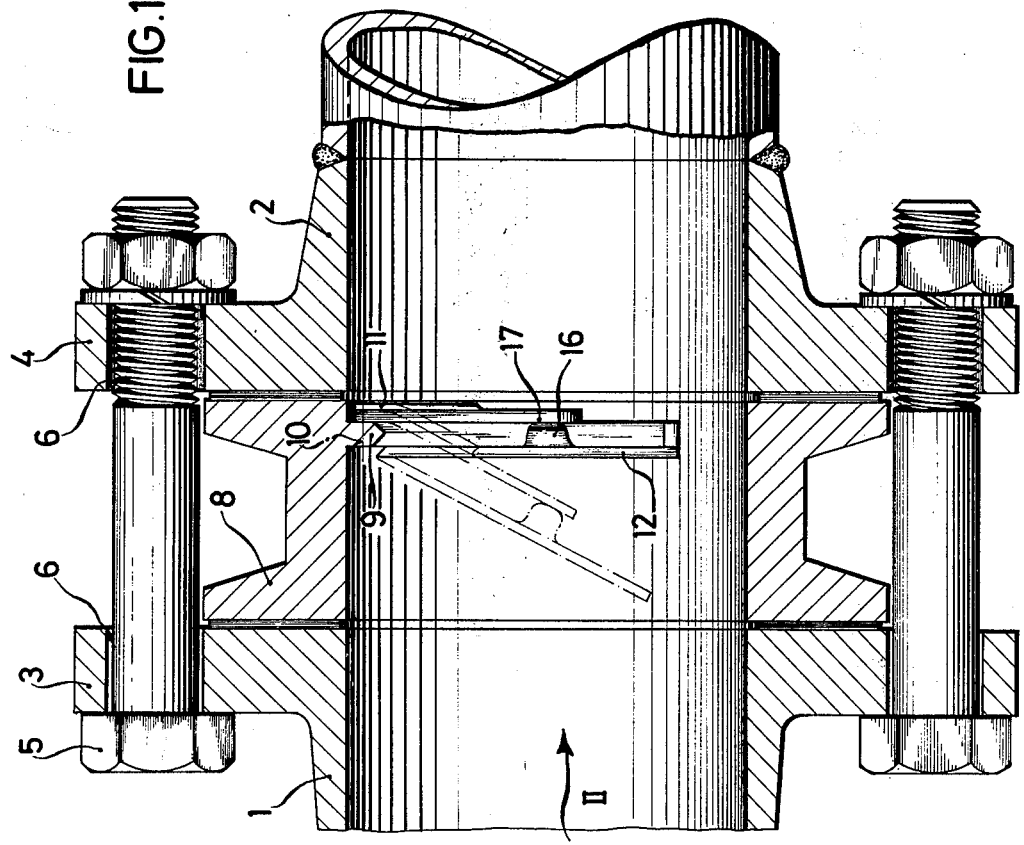

FLOW-LIMITING DEVICE FOR A PIPE CARRYING A FLUID OR GASEOUS MEDIUM

BACKGROUND OF THE INVENTION

The invention relates to a flow-limiting device for a pipe carrying a fluid or gaseous medium which supplies a connected consumer with an essentially constant amount of the medium, which flow-limiting device alters the cross-sectional area of flow through the pipe dependent on the kinetic energy differential upstream and downstream of a spring-loaded body.

The invention is particularly applicable to the controlling and metering of flowing media which are, on the one hand, at an elevated temperature and, on the outer hand, are dirty. Examples are long distance heating mains, but also ammoniacal liquor mains from coal pressure gasification plants which carrying slurries which contain tar and dust.

A known flow-limiting device has a housing which essentially corresponds to a valve housing. It has a seating opposite which a cone-shaped body is displaced in order to alter the cross-sectional area of flow through the pipe. The cone-shaped body sits on a rod to which a membrane is fastened. This is subjected on one side to the pressure upstream of a diaphragm acting as a differential pressure producer and on the other side to the pressure downstream of the diaphragm. The rod is surrounded by a sprial spring. This spring pre-loads the cone-shaped body. This arrangement varies the cross-sectional area of flow through the pipe to permit the passage of a predetermined, substantially constant quantity of the medium.

The complicated construction of such a limiting device is disadvantageous. In particular, control tubes are provided which lead to a chamber containing the membrane, and these control tubes become blocked with dirt from the flowing medium. The limiting device can not be used in these cases.

The task of the invention consists in creating a cheaper and essentially service-free flow-limiting device which is not susceptible to elevated temperatures and dirt in the medium.

SUMMARY OF THE INVENTION

According to the invention there is provided a flow-limiting device for a pipe carrying a fluid or gaseous medium, comprising a flap, means mounting the flap in the pipe for pivotal movement relatively thereto in a manner to vary the cross-sectional area of flow through the pipe, and spring means urging the flap in a direction to increase said cross-sectional area and against the direction of flow through the pipe, whereby the flap varies the cross-sectional area of flow through the pipe in dependence on the kinetic energy differential of the medium upstream and downstream of the flap.

This arrangement has the advantage that the membrane and the parts associated with it, in the prior art device, are eliminated, and only a small number of moved or movable parts are present. Not only are the components for determining the pressure in the prior art limiting device eliminated, but also the seals necessary with such an arrangement, with which seals the componets leading from the pipe line having to be sealed against the medium. Thus the flow-limiting device according to the invention is especially suitable for use in systems which carry a high temperature medium since high temperature can have a deleterious effect on such seals. The simple construction of a device according to the invention makes possible cheap manufacture and service-free operating.

Furthermore, since in a device according to the invention, a slight swinging movement of the flap may be made sufficient to open up a relatively large cross-section of the pipe, blocking of the pipe cross-section may be avoided when the medium is dirty. For this reason it is provided, according to a further characteristic of the invention, that the flap is mounted in the pipe for pivotal movement about an upper edge of the flap. The aforesaid spring means may constitute the means mounting the flap in the pipe.

The spring means may comprise a leaf spring which is located in a annular housing which can be inserted in the pipe, which housing includes a rib extending partially around the inner circumference of the housing, which rib serves for attaching the leaf spring and as a stop for limiting the pivotal movement of the flap. By incorporating the flow-limiting device in a housing, it is rendered suitable for subsequent installation in existing pipe lines. The housing can be manufactured for any size of connection and the limiting device can be set and calibrated for any desired through-put flow. The flap is preferably so shaped and dimensioned as to leave a space between a lower portion of the flap and the internal wall of the pipe when the flap is in a position to provide a minimum cross-sectional area of flow though the pipe. This facilitates the passage of deposits and thus prevents blocking of the pipe by such deposits in the area of the flow-limiting device.

BRIEF DESCRIPTION OF THE DRAWINGS

The following is a more detailed description of one embodiment of the invention, reference being made to the accompanying drawings in which:

FIG. 1 is a longitudinal section through a pipe with a flow-limiting device according to the invention; and FIG. 2 is a view in the direction of the arrow II of the pipe and flow-limiting device of FIG. 1.

DESCRIPTION OF THE PREFERRED EMBODIMENT

Two pipe sections 1, 2 of a long distance heating main, not shown in detail, and which terminate in flanges 3,4 respectively, are fastened together with bolts 5 which pass through drilled holes 6 in the flanges 3,4. Hot water flowing from the long distance heating system flows in the direction of the arrow II, to the consumer.

A flow-limiting device is fitted between the flanges 3,4 which device consists of an annular housing 8 whose internal diameter corresponds to the internal diameter of the pipe sections 1,2. The housing 8 features an inwardly projecting part-annular rib 9 which extends partly around the internal circumference of the housing 8. The part-annular rib 9 leaves free the lower part of the cross-section of flow thrugh the body 8, as best seen in FIG. 2.

In the upper part of the cross-section of flow a leaf spring 11 is attached, for example by screws or rivets, to the part-annular rib 9 at 10. The leaf spring is generally trapezoidal in shape (see FIG. 2) and is attached to the part-annular rib 9 at its wider end, whilst the narrower end carries a flap 12.

In the illustrated embodiment, the flap is in the shape of a circle with upper and lower segments removed. The circular portion of the flap is somewhat smaller in diameter than the cross-section of flow, so that the flap 12 can be swung between the positions shown in full lines and dash-dotted lines respectively in FIG. 1. The angle of swing of the flap 12 is determined by the properties of the leaf spring 11 which is so formed and pretensioned as to urge the flap 12 against the direction of flow, so that the flap 12 moves to a position to provide a larger partial cross-sectional area of flow with a lower pressure differential upstream and downstream of the flap 12 than with a higher pressure differential. It will be appreciated that the pressure differential may equally well be regarded as a kinetic energy differential as referred to earlier and in the claims.

The generally circular shape of the flap 12 is broken at its upper part by a straight edge 13 by which the flap 12 can support itself on corresponding portions of the annular flange 9 to avoid tilt movements which would otherwise have to be borne by the leaf spring 11. Thus the leaf spring 11 can be formed lighter.

In a similar manner the generally circular shape of the flap 12 is broken by a straight edge 14 in the lower part of the cross-section of flow. In this lower part is also disposed the gap in the part-annular rib 9. This gap provides a clear space 15 in the cross-section of flow through which deposits from the heating medium can pass without interfering with or blocking the limiting device.

The leaf spring 11 and the flap 12 are set and calibrated for a desired constant quantity of flow. On variation of the differential of the kinetic energy upstream and downstream of the flow-limiting device the leaf spring 11 is deformed by the action of the flow on the flap 12 and the available cross-section of flow is so modified that the quantity of flow of the heating medium remains substantially constant.

In order to avoid the leaf spring being overstressed, the part-annular rib 9 also serves as a stop for the flap 12 when it is in the position in full lines in FIG. 1. Since, with this arrangement, the flap 12 rests against the upstream side of the part-annular rib 9, whilst the leaf spring 11 is mounted on the downstream side, a projection 16 is provided on the flap 12 in the area of engagement 17 between the leaf spring 11 and the flap 12. The height of the projection 16 corresponds approximately to the thickness of the part-annular rib 9 to which the leaf spring 11 is attached.

I claim:

1. A fow limiting device for a pipe carrying a fluid or gaseous medium, said medium flowing in a first direction, comprising:

a housing having a bore therethrough; an annular rib extending part way around the circumference of said bore, said annular rib further extending radially into said bore;

a flap member mounted in said bore adjacent said annular rib for movement with respect to said annular rib;

means for mounting said flap member for movement in said bore, said mounting means connecting said flap member to said annular rib, said means for mounting said flap member further comprising resilient biasing means connecting said partial annular rib to said flap member such that said resilient means urges said flap member in a direction opposite said first direction of flow and thereby increase said cross-sectional area of flow through the pipe in dependence on the kinetic energy differential of the medium upstream and downstream of the flap member; and said flap member further being shaped to have a space between said flap member and the internal wall of the bore which together with that portion of the circumference of the bore not having an annular rib portion defines a passage to provide flow through the pipe when the flap member is positioned to provide a minimum cross-section area of flow through the pipe.

2. A flow limiting device as claimed in claim 1 wherein said flap member further comprises an upper edge juxtaposed said annular rib of the housing, said upper edge of said flap member being movable with respect to said annular rib in response to movement of said resilient biasing means.

3. A flow limiting device as claimed in claim 1 wherein said resilient biasing means comprises a leaf spring having one end and an other end, said one end being fixedly mounted to said annular rib and said other end engaging said flap member.

4. A flow limiting device as claimed in claim 1 wherein said annular rib extending part way around the circumference of said bore serves as a stop to limit the movement of the flap.

* * * * *

UNITED STATES PATENT AND TRADEMARK OFFICE
CERTIFICATE OF CORRECTION

PATENT NO. : 4,141,380
DATED : February 27, 1979
INVENTOR(S) : Arthur Lenk

It is certified that error appears in the above-identified patent and that said Letters Patent are hereby corrected as shown below:

Column 1, line 16, delete the word "outer" and insert therefore the work ----other----.

Column 1, line 18, delete the word "carrying" and insert therefore the word ----carry----.

Column 1, line 64, delete the word "having" and insert therefore the word ----have----.

Column 2, line 58, delete the word "thrugh" and insert therefore the word ----through----.

Column 3, line 39, after the word "position" insert the word ----shown----.

UNITED STATES PATENT AND TRADEMARK OFFICE
CERTIFICATE OF CORRECTION

PATENT NO. : 4,141,380

DATED : February 27, 1979

INVENTOR(S) : Arthur Lenk

It is certified that error appears in the above-identified patent and that said Letters Patent are hereby corrected as shown below:

Column 4, line 2, delete the word "fow" and insert therefore the word ----flow----.

Column 4, line 30, delete the word "cross-section" and insert therefore the word ----cross-sectional----.

Signed and Sealed this

Tenth Day of July 1979

[SEAL]

Attest:

LUTRELLE F. PARKER

*Attesting Officer*  *Acting Commissioner of Patents and Trademarks*